US007927527B2

(12) United States Patent
Thomassen et al.

(10) Patent No.: US 7,927,527 B2
(45) Date of Patent: Apr. 19, 2011

(54) METHOD AND MOULD FOR MANUFACTURING PELLETS OF HOT-MELT INK

(75) Inventors: Franciscus H. M. Thomassen, Tienray (NL); Hendrik M. J. Habets, Venlo (NL)

(73) Assignee: Océ-Technologies B.V., Venlo (NL)

( * ) Notice: Subject to any disclaimer, the term of this patent is extended or adjusted under 35 U.S.C. 154(b) by 566 days.

(21) Appl. No.: 11/883,579

(22) PCT Filed: Jan. 26, 2006

(86) PCT No.: PCT/EP2006/000803
§ 371 (c)(1),
(2), (4) Date: Aug. 2, 2007

(87) PCT Pub. No.: WO2006/082014
PCT Pub. Date: Aug. 10, 2006

(65) Prior Publication Data
US 2008/0122139 A1 May 29, 2008

(30) Foreign Application Priority Data

Feb. 4, 2005 (EP) .................................. 05100762

(51) Int. Cl.
*D01D 5/40* (2006.01)
*B29C 37/00* (2006.01)
*B28B 13/06* (2006.01)
(52) U.S. Cl. .............. 264/140; 264/161; 264/297.1; 264/297.8; 264/299; 264/328.14; 264/334; 249/81; 249/105; 249/106; 249/108; 249/119; 249/120; 249/121

(58) Field of Classification Search .................. None
See application file for complete search history.

(56) References Cited

U.S. PATENT DOCUMENTS

| 2,163,814 | A | * | 6/1939 | Swarovski | 264/274 |
| 3,164,654 | A | * | 1/1965 | Spencer | 264/311 |
| 4,087,227 | A | * | 5/1978 | Uhlig | 425/526 |
| 4,097,018 | A | * | 6/1978 | O'Herien | 249/105 |
| 4,884,962 | A | * | 12/1989 | Sheffield | 425/234 |
| 5,049,330 | A | * | 9/1991 | Rebhan | 264/84 |
| 5,741,388 | A | * | 4/1998 | Gerster et al. | 156/245 |
| 5,780,018 | A | * | 7/1998 | Collins et al. | 424/64 |
| 5,971,351 | A | * | 10/1999 | Swaab | 249/117 |

(Continued)

FOREIGN PATENT DOCUMENTS
EP          0 978 548 A1    2/2000

(Continued)

*Primary Examiner* — Jeffrey Wollschlager
(74) *Attorney, Agent, or Firm* — Birch, Stewart, Kolasch & Birch LLP

(57) ABSTRACT

A method and a mould for manufacturing pellets of hot-melt ink are disclosed wherein use is made of a multiple mould containing at least three dies detachably attached to one another which define mold cavities and corresponding filling holes. In the moulding process, the cavities are overfilled such that after solidification ink protrudes in the filling openings formed in a single die and prior to removal of the pellets from the mould cavities, the die containing the protrusions is separated from the other dies whereby the ink pellets formed are substantially free of holes and/or protrusions hampering the free flow of such pellets when introduced in a dosing system.

14 Claims, 3 Drawing Sheets

U.S. PATENT DOCUMENTS

| | | | |
|---|---|---|---|
| 6,375,880 B1 * | 4/2002 | Cooper et al. | 264/138 |
| 6,626,655 B1 * | 9/2003 | Rivola et al. | 425/84 |
| 6,656,238 B1 * | 12/2003 | Rogers et al. | 44/620 |
| 6,673,299 B2 * | 1/2004 | Hollands et al. | 264/327 |
| 6,692,668 B2 * | 2/2004 | Ogrinc et al. | 264/28 |
| 7,005,098 B2 * | 2/2006 | Cavallaro et al. | 264/250 |
| 7,252,280 B2 * | 8/2007 | Hollands et al. | 249/81 |
| 2002/0130440 A1 | 9/2002 | Hollands et al. | |
| 2002/0171160 A1 * | 11/2002 | Ogrinc et al. | 264/28 |
| 2005/0007428 A1 | 1/2005 | Joppen | |
| 2008/0248888 A1 * | 10/2008 | Chrisman | 473/125 |

FOREIGN PATENT DOCUMENTS

| | | |
|---|---|---|
| EP | 1 236 577 A1 | 9/2002 |
| EP | 0 856 565 B1 | 4/2004 |
| EP | 1 067 157 B1 | 5/2004 |
| EP | 1 221 467 B1 | 4/2005 |
| JP | 63-205241 A | 8/1988 |
| JP | 2-113951 A | 4/1990 |
| JP | 9-272242 A | 10/1997 |

* cited by examiner

METHOD AND MOULD FOR MANUFACTURING PELLETS OF HOT-MELT INK

This application claims priority from International Application PCT/EP2006/000803 filed Jan. 26, 2006 which claims priority from European Patent Application No. 05100762.3 filed on Feb. 4, 2005, the entire contents of each are hereby incorporated by reference.

BACKGROUND OF THE INVENTION

The present invention relates to a method and a mould for manufacturing pellets of hot-melt ink.

Certain types of inkjet printers employ a so-called hot-melt ink, i.e., a wax-like ink material that is solid at room temperature and has a melting point in the order of 100 or 120° C., for example. In the print head of the printer, the ink is heated above its melting point, so that droplets of liquid ink can be expelled through the nozzles of the print head. In order to obtain a high quality of the printed image, the viscosity and hence the temperature of the molten ink in the print head should be maintained essentially constant. However, since the ink is consumed in the course of the printing process, and the ink reservoir accommodating the liquid ink within the print head is only of a limited size, it is necessary to supply and melt solid ink while the printer is operating, and the latent heat required for melting the ink tends to decrease the temperature in the ink reservoir. For this reason, it is desirable that the amount of solid ink supplied to the ink reservoir can precisely be controlled and metered, and, to this end, it is advantageous that the ink is supplied in the form of pellets having a predetermined size and shape, e.g., in the form of small spherical pills.

Since the hot-melt ink is a thermoplastic material, the pellets having the desired shape and size can be manufactured by means of a moulding process similar to injection moulding processes known for manufacturing articles from thermoplastic resin. The moulding process should, however, be adapted to the specific properties of hot melt ink which are in certain respects different from those of thermoplastic synthetic resins. Since the amount of shrinkage, which the hot-melt ink experiences when it is solidified, is comparatively low, and since a certain shrinkage can be tolerated because the final appearance of moulded ink pellets is not critical, it is not necessary to apply high locking forces for keeping the mould closed during the moulding process. On the other hand, since the hot-melt ink has a relatively low melting point, it tends to solidify immediately when it comes into contact with the walls of the mould cavity. This effect and the fact that the surface of the ink pellet is somewhat tacky even when the temperature has dropped below the melting point, increases the tendency of the pellet to adhere to walls of the mould cavity. This makes it more difficult to reliably and reproducibly remove the pellet from the mould.

EP1236577 is related to a method and a mould for manufacturing pellets of hot-melt ink. In particular, a mould is disclosed comprising two dies defining a mould cavity. The upper die defines also the runner hole through which the ink is guided to the mould cavity. In case the mould cavity is overfilled, there is the risk that after solidification of the ink and removal of the ink pellet from the mould, the ink pellet has a protrusion originating from the overfilled ink in the runner hole. On the other hand, in case the mould cavity is not completely filled, there is the risk that after solidification of the ink and the accompanying shrinkage, a hole remains in the ink pellet. Although the exact form of the pellets is not that important, both larger holes in the pellets and protrusions on the pellets are undesirable as they may hamper the free flow of ink pellets in an ink pellet dosing system. To avoid such protrusions or holes, an option could be to carefully control the pouring process such as to avoid overfilling or incompletely filling of the mould cavity. However, in practice it has been observed that even if one has excellent control over the pouring process, still part of the manufactured pellets have large holes or protrusions because of, e.g., the size variations of the mould cavities and variations of the ink viscosity which is detrimental for the manufacturing yield. One could also subject the pellets provided with a protrusion to an extra processing treatment in an attempt to remove the protrusion. Besides the fact that this substantially increases costs, it is observed that a large part of such pellets are still out of specifications because the protrusion is only partly removed or because by the removal of the protrusion a large hole is generated in the pellet.

SUMMARY OF THE INVENTION

An object of the present invention to provide a method and a mould for manufacturing pellets of hot-melt ink, in which the ink pellets formed are substantially free of holes and/or protrusions hampering the free flow of such pellets when introduced in a dosing system.

A further object of the present invention is to provide a method and a mould for manufacturing pellets of hot-melt ink, in which even when the ink material tends to adhere to the walls of the mould cavity, the pellets can reliably and reproducibly be withdrawn from the mould.

In a first aspect of the present invention, a method is disclosed for manufacturing pellets of hot-melt ink, comprising the steps of:

pouring molten ink through a filling hole formed in a first die of a mould into a mould cavity defined by at least a second die and a third die of the mould so as to overfill the mould cavity, wherein the first, second, and third dies are detachably attached to each other, allowing the ink to cool down and to solidify in the mould, separating the first die from the second and third dies thereby removing any overfilled solidified ink and exposing the filling opening of second die, and separating the second die and the third die and removing the ink pellet therefrom. Preferably, the mould cavity has a substantially spherical shape. Typical hot melt inks are known inter alia from European patent applications EP 0 856 565, EP 0 978 548, EP 1 067 157 and EP 1 221 467.

According to the present invention, the mould cavity is overfilled with liquid ink. As a result, when the ink solidifies, despite the accompanying shrinkage, usually a part of the ink solidifies in the filling opening in the first die. When separating the first die from the dies defining the mould cavity prior to the removal of the ink pellet from the mould cavity the ink protruding from the mould cavity into the filling opening is simultaneously removed. The separation interface between the protrusion and the ink pellet in the cavity is well defined by the contact plane between the first die and the second die.

Hence the ink pellets formed are substantially free of holes and/or protrusions hampering the free flow of such pellets for instance when introduced in a dosing system.

In an embodiment of the present invention, the smallest diameter of the filling hole is in the range from 10% to 30% of the diameter of the mould cavity. A too small diameter of the filling hole would hamper the filling process, while a too large diameter would result in a pellet having a too large flat surface which is detrimental to the flow properties of the pellets. The filling hole may have a substantial conical shape. An advantage thereof is that the ink protrusions remaining in the first die after the separation from the other dies, can be easily removed, e.g., using an ejector nozzle or pin acting upon the ink protrusion in the filling hole.

Moreover, when separating the first die from the other dies, also the filling opening of the second die and thus also a part of the ink pellet surface is exposed. When separating the second die from the third die, the ink pellet may adhere to the second die. In such a case, the ink pellet can be removed by ejecting it from the second die by means of an ejector nozzle or pin acting upon the ink pellet through the filling opening. Alternatively, the pellets may be separated from the second or third die by vibrating this die.

To avoid that the pellet adheres to the third die, with reference to EP1260562, the ink in the mould cavity may be cooled with a cooling rate that results in a shrinkage sufficient to cause the solidifying ink to separate, at least from the third die. This may be done by guiding cooled gas, e.g., air, or a cooling liquid through passages formed for instance in the third die or by positioning the entire mould in thermal contact with a cooled body or in a cooling chamber. Although, as stated before, the amount of shrinkage of hot-melt inks is comparatively low, such inks show a certain shrinkage effect when they are solidified. It has been found that, for the commonly used hot-melt ink compositions, the amount of shrinkage depends on the cooling rate with which the ink is solidified. When the molten ink is poured into the mould cavity, the heat of the ink is dissipated through the walls of the mould, and the solidification process starts at the internal walls of the mould cavity and then proceeds towards the interior of the pellet. It has been observed that the shrinkage effect is a relatively uniform contraction of the pellet as a whole rather than the formation of voids in the interior of the pellet. Thus, the contraction of the pellet solidifying in the mould cavity forces the outer layer of the ink material to withdraw and separate from the wall surface of the mould. As a result, the removal of the pellet from the mould can be facilitated by appropriately controlling the amount of shrinkage, i.e., by appropriately adjusting the cooling rate at which the solidification process takes place.

To avoid that the pellet adheres to the third die, with reference to EP1236577, prior to separating the second and the third dies, the solidified ink pellet is separated from the wall of the mould cavity by heating at least a portion of the mould, so that a surface layer of the pellet is remelted. This can be achieved within a very short time. Thus, it is possible to remove the pellet from the mould cavity efficiently and in a well-defined manner. Since it is not necessary to employ a separating agent, the quality of the hot-melt ink will not be degraded. When the third die of the mould is heated before the second and third dies are separated, it is possible to positively release the pellet from the third die and to withdraw it from the third die, taking advantage of the fact that the pellet tends to adhere to the second die which is not heated. Then, the pellet may released from the second die by any suitable means as discussed in previous embodiments.

In another embodiment of the present invention the method of manufacturing ink pellets uses a mould including four dies. In particular, the mould includes a fourth die having a substantially flat contact surface and being detachably attached to the third die. In this implementation, the mould cavity is defined by a hole in the second die, communicating with the filling hole, and a hole in the third die, communicating with the hole in the second die and the contact surface of the fourth surface through an ejecting opening. Prior to separating the second die and the third die, the method further comprises the step of separating the fourth die from the second and third dies thereby exposing the ejecting opening of third die. Once the dies are separated, the ink pellet can be removed either by ejecting it from the second or third die, depending to which die the pellet adheres, by means of an ejector nozzle or pin acting upon the ink pellet through the filling opening or the ejecting opening, respectively. The advantage thereof is that, regardless to which mould cavity walls the pellets tend to adhere, the pellets can reliably and reproducibly be withdrawn from the mould according to the present invention, the mould dies may form a multiple mould having a plurality of mould cavities and a corresponding plurality of filling holes.

In a second aspect of the present invention, a mould is disclosed for manufacturing pellets of hot-melt ink, the mould comprising a first die and at least a second and a third die, each of the dies being detachably attached to one another, the first die having a filling hole communicating with a corresponding mould cavity as defined by the second and third dies. Preferably, the mould cavity as defined is substantially spherical.

The mould cavity may be defined by a hole in the second die, communicating with the filling hole in the first die, and a cavity in the third die, communicating with the hole in the second die. As a first alternative, the mould may further comprise a fourth die detachably attached to the third die, wherein the cavity in the third die is a hole communicating with a surface of the fourth die so that the mould cavity is defined by the second, third and fourth dies. In this case the surface of the fourth die contacting the third die is substantially flat. As a second alternative, the mould may further comprise a fourth die detachably attached to the third die, wherein the cavity in the third die is a hole communicating with a cavity formed in the fourth die so that the mould cavity is defined by the second, third and fourth dies.

In another embodiment of the present invention, the edges of the mould defining the mould cavity have a surface roughness, Ra, of 0.6 μm or below. An advantage thereof is that the force with which a pellet tends to adhere to the edges is rather low such that the pellet can easily be removed by gravity, ejection or vibration. In this context, it is also preferable if the mould is made of a material having a high heat conductivity, e.g., a metal such as steel or aluminium.

BRIEF DESCRIPTION OF THE DRAWINGS

The present invention will become more fully understood from the detailed description given herein below and the accompanying drawings, which are given by way of illustration only, and thus are not limitative of the present invention, and wherein.

DETAILED DESCRIPTION OF THE INVENTION

In conjunction with the appended drawings, the present invention is described in detail in the sequence. Several embodiments are disclosed. It is apparent however that a person skilled in the art can imagine several other equivalent embodiments or other ways of executing the present invention, the scope of the present invention being limited only by the terms of the appended claims.

Figure 1:
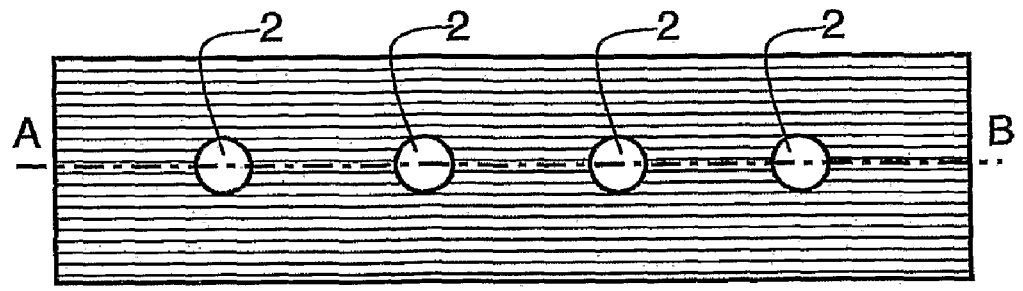
FIGS. 1 to 5 schematically depict, according to an embodiment of the present invention a process for moulding hot-melt ink pellets and removing them from the mould cavity.
Figure 1:
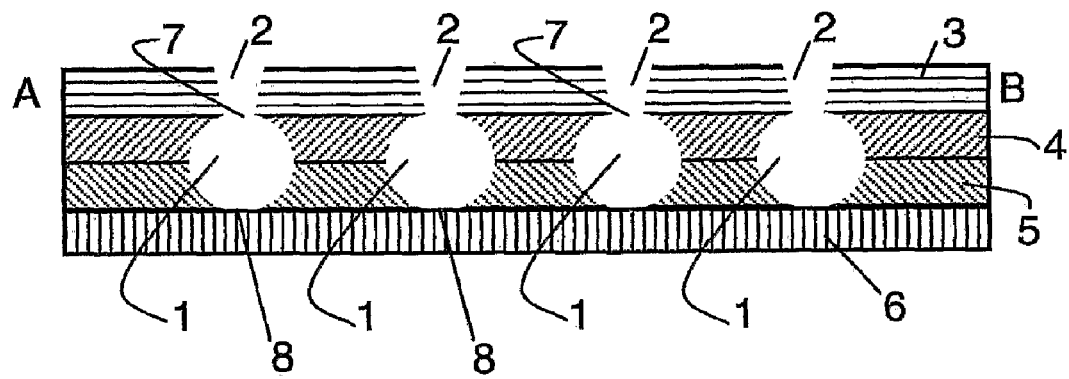

FIG. 1 shows a top view and a cross-sectional view taken along the line AA' of a multiple mould having a plurality of mould cavities and a corresponding plurality of filling holes. To illustrate the multiple mould and the moulding process four mould cavities 1 and four corresponding filling holes 2 are shown. The multiple mould is build up of four dies which are firmly but detachably attached to each other by connecting means such as for instance screws (not shown). In practice several hundreds or thousands of mould cavities may be provided. All four dies have a substantially box shape and are composed of steel. However, other metals such as, e.g., aluminium may be used and also other materials, such as, e.g., plastics, may be used as long as they have a high heat conductivity and can resist temperatures up to about 150 degrees Centigrade without deforming. In the first die 3 flattened conical perforations are made. These perforations are referred to as filling holes 2. The filling hole has its smallest diameter at the interface with the second die where it defines a filling opening 7 to the mould cavities. The second die 4 is provided with a substantially semi-spherical cup-shaped perforated cavity which partially defines the mould cavity. These perforations formed in the centre of the cavities are aligned with and match the filling holes at the filling openings 7. The third die 5 is also provided with a substantially semi-spherical cup-shaped perforated cavity which partially defines the mould cavity. The cavities formed in the second and third dies respectively are essentially mirror-symmetric. The perforations in the center of the cavities of the third die define ejecting openings 8 at the interface with the fourth die 6. The surface of the fourth die contacting the third die is substantially flat.

Figure 2:
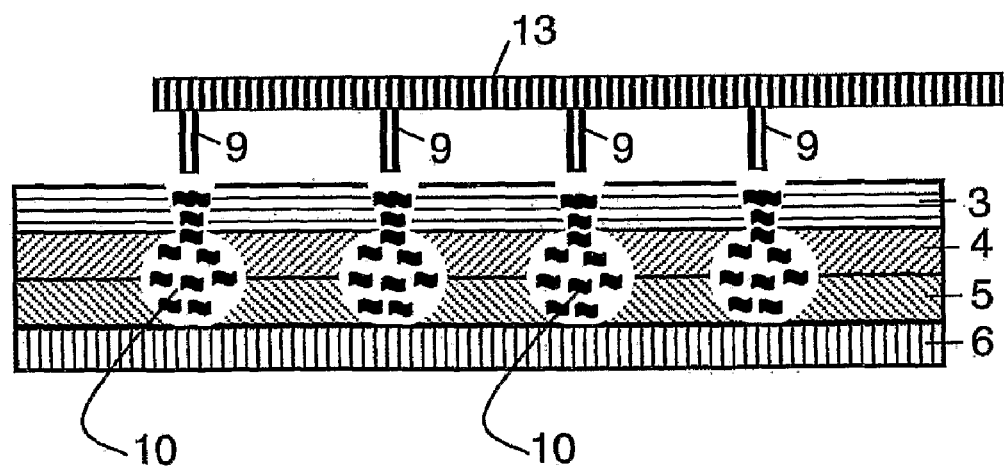
Figure 3:
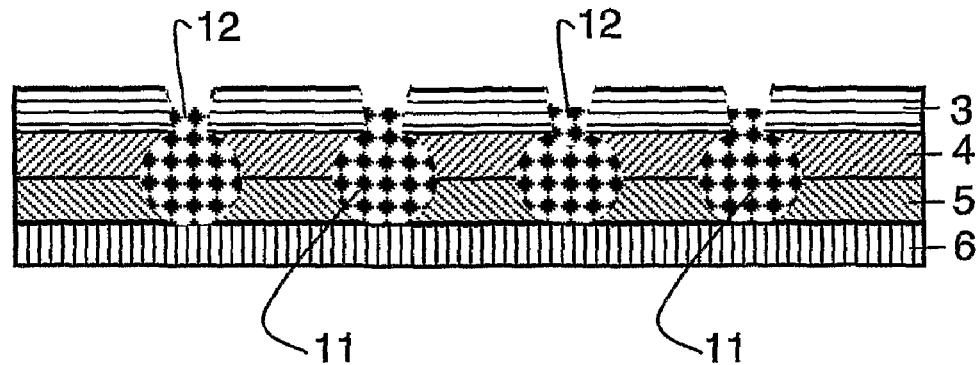

As depicted in FIG. 2 and FIG. 3, in order to manufacture ink pellets, molten hot-melt ink 10 is transported via an ink supply passage 13 to the multiple mould, where the ink is poured by nozzles 9 through the filling holes 2 into the mould cavities 1. The filling process is tuned such that a mould cavity having average dimensions is overfilled such that the molten ink partially fills the filling hole. The filling process may be a sequential process in which there are less nozzles available than mould cavities provided in the multiple mould such that not all mould cavities can be filled simultaneously. In such case, when the first part of the mould cavities have been overfilled, the ink supply passage with the nozzles may be displaced with respect to the multiple mould so as to bring the next part of the multiple mould into the position of the nozzles, whereupon the filling process is repeated. Alternatively, the number of available nozzles may be at least as high as the number of mould cavities such that all cavities can be filled simultaneously. The nozzles and the ink supply passage may be surrounded by a thermally insulating material in order to prevent the molten ink from solidifying prematurely in the nozzles or in the ink supply passage. After the filling process, the ink in the mould cavities and filling holes is allowed to cool down and solidify. As a result substantially spherical pellets 11 are formed, the majority of which having protrusions 12 extending into the filling holes 2. The solidification process may be accompanied by a shrinkage of the ink dependent upon the cooling rate and the ink composition.

The shrinkage may be such that the outer surface of the ink pellet is separated from the edges of the respective dies defining the mould cavity. This shrinkage is rather limited. In practice, the shrinkage may amount to approximately 1-3% in volume.

Figure 4:
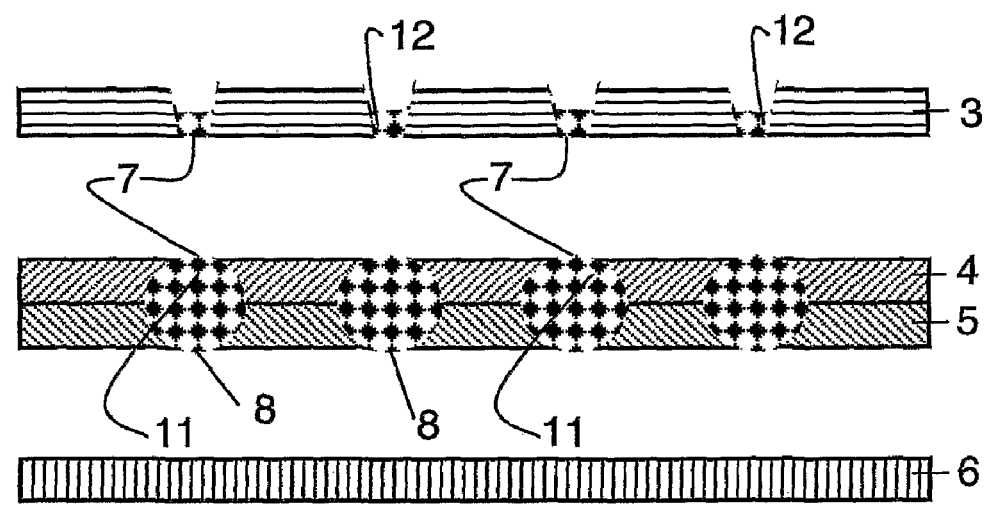

Then, as is shown in FIG. 4, the first and fourth dies are separated from the second and third dies by lifting the first die and lowering the fourth die thereby exposing both the filling openings 7 and the ejecting openings 8. As a consequence also the ink protrusions 12 in the filling holes are separated from the ink pellets in the mould cavities. As the separation interface is well defined, the pellet has a substantially flat surface at its top with a circular area defined by the circular area of the filling opening. In this case the diameter of this area is about 25% of the diameter of the ink pellet. The ink pellet has a diameter of 12 cm. The ink pellets typically may have a predetermined diameter in the range from 7 cm to 15 cm although the present invention is certainly not limited thereto. The pellets also have a substantially flat surface at their bottoms with a circular area defined by the circular area of the ejecting opening where the pellet was in contact with the flat surface of the fourth die. In this case the diameter of this area is about 25% of the diameter of the ink pellet.

Figure 5:
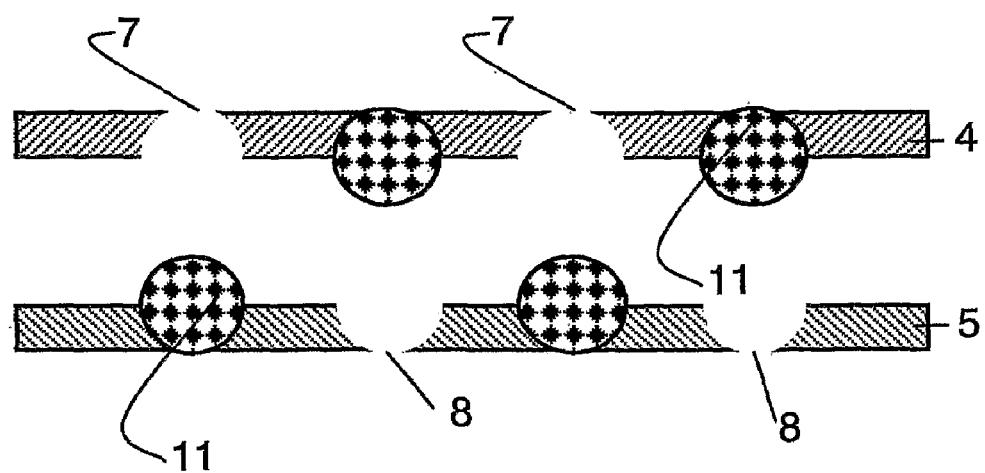

Subsequently, as is shown in FIG. 5, the second and third dies of the mould are separated from one another. A part of the pellets may stick to the second die 4, while the other part of the pellets remains on lower third die 5 either because they stick to the third die or because they are already separated from the dies. The pellets still sticking to the dies only slightly adhere thereto partially because they were subjected to some shrinkage and because of the edges of the second and third dies defining the mould cavities have a low surface roughness value, Ra, of about 0.5. The pellets adhering to the second and third dies, respectively, are removed therefrom by inserting pins through either the filling openings or ejecting openings thereby ejecting the pellets without damaging them. Instead of inserting pins, nozzles may be positioned at the filling or ejecting openings for ejecting the pellets with compressed air. The ink pellets removed from the dies are then collected.

Thus, the moulding process for manufacturing the pellets 11 is completed. After removing the protrusions 12 from the first die, e.g., using pins or nozzles as described above, all dies may be re-circulated for use in another moulding cycle.

According to another embodiment of the present invention an analogous moulding process as disclosed in FIGS. 1 to 5 is disclosed in FIGS. 6 to 9 using a modified multiple mould and yielding slightly differently shaped pellets. In the following description, the differences with respect to the previous embodiment are highlighted, and hence the teaching of the previous embodiment can be combined with the following description.

Figure 6:
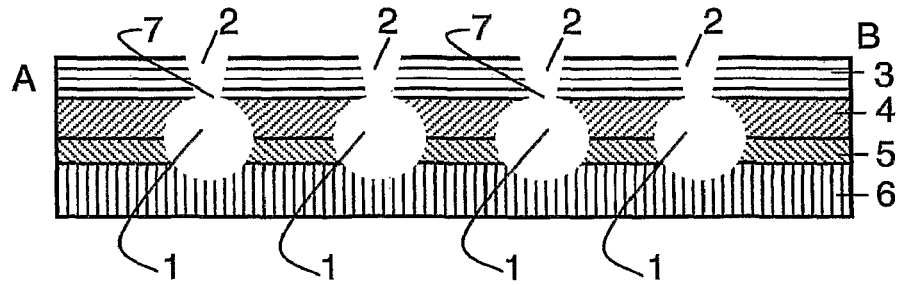
FIGS. 6 to 9 schematically depict, according to an embodiment of the present invention a process for moulding hot-melt ink pellets and removing them from the mould cavity.
Figure 7:
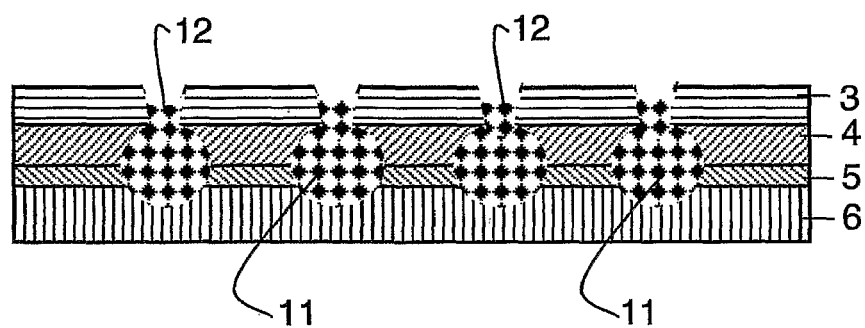
Figure 8:
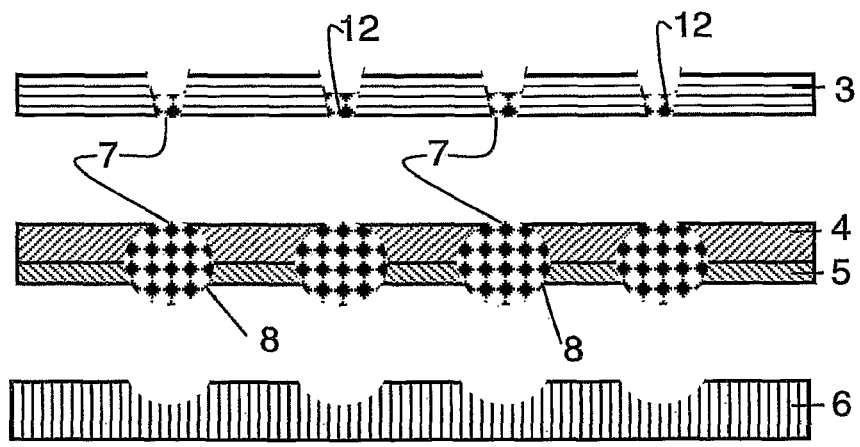
Figure 9:
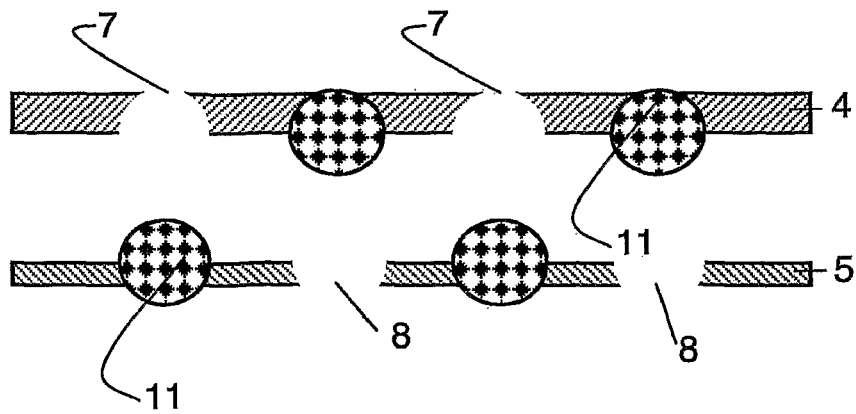

FIG. 6 shows a cross-sectional view taken along the line AA' of a multiple mould having a plurality of mould cavities and a corresponding plurality of filling holes. Four mould cavities 1 and four corresponding filling holes 2 are shown. The multiple mould is built up of four dies which are firmly but detachably attached to one another by connecting means such as for instance screws (not shown). All four dies have a substantially box shape and are composed of steel. The first die 3 comprises filling holes 2 and defines filling openings 7. The second die 4 is provided with substantially semi-spherical cup-shaped perforated cavities which partially define the mould cavities. The third die 5 is provided with perforated cavities each defining a segment of a sphere which partially defines the mould cavity. The perforations in the center of the cavities of the third die define ejecting openings 8 at the interface with the fourth die 6. The fourth die 6 is provided with cavities defining segments of a sphere which partially define the mould cavities. The combined cavities formed by the perforated cavities in the third die and the corresponding cavities in the fourth die are substantially semi-spherically cup-shaped. The cavities formed in the second and the combined third and fourth dies respectively are essentially mirror-symmetrical. The successive steps in the moulding process depicted in FIGS. 7 to 9 are substantially analogous to the steps depicted in FIGS. 2 to 5. Although the Figures do not show enough detail to clearly visualise this, the difference is that the resulting pellets are only flattened at one side, i.e., at the filling opening, instead of at both sides as described in the previous embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for manufacturing pellets of hot-melt ink, comprising the steps of:
    pouring molten ink through a filling hole formed in a first die of a mould into a mould cavity defined by at least a second die and a third die of the mould so as to overfill the mould cavity and cause excess molten ink to partially extend into the filling hole, wherein the filling hole in the first die is configured to have its smallest diameter at the interface between the first and second dies, said first, second, and third dies being detachably attached to one another,
    allowing the ink to cool down and solidify in the mould,
    separating the first die from the second and third dies thereby removing any overfilled solidified ink between the first and second dies and exposing a filling opening of the second die, and
    separating the second die and the third die and removing the ink pellet therefrom.

2. The method as recited in claim 1, wherein the mould cavity has a substantially spherical shape.

3. The method as recited in claim 1, wherein the filling hole has a substantial conical shape.

4. The method as recited in claim 3, wherein the smallest diameter of the filling hole is from about 10% to 30% of the diameter of the mould cavity.

5. The method as recited in claim 1, wherein the ink pellet is removed by ejecting it from the second die by means of an ejector nozzle or pin acting upon the ink pellet through the filling opening.

6. The method as recited in claim 1, wherein the mould includes a fourth die having a substantially flat contact surface, the fourth die being detachably attached to the third die, and wherein the mould cavity is defined by a hole in the second die communicating with the filling hole and a hole in the third die communicating with the hole in the second die and the contact surface of the fourth die through an ejecting opening, the method further comprising the step of separating the fourth die from the second and third dies thereby exposing the ejecting opening of third die prior to separating the second die and the third die.

7. The method as recited in claim 6, wherein the ink pellet is removed by ejecting it from the third die by means of an ejector nozzle or pin acting upon the ink pellet through the ejecting opening.

8. The method as recited in claim 1, wherein said-mould dies comprise multiple moulds having a plurality of mould cavities and a corresponding plurality of filling holes.

9. The method of claim 1, wherein to avoid that the pellet adheres to the third die, the ink in the mould cavity is cooled, resulting in a shrinkage sufficient to cause the solidifying ink to separate from the die.

10. The method of claim 1, wherein to avoid that the pellet adheres to the third die, prior to separating the second and third dies, the solidified ink pellet is separated from the wall of the mould cavity by heating at least a portion of the mould to remelt the surface layer of the pellet.

11. The method of claim 1, wherein the filling hole has an internal dimension smaller than that of the mold cavity.

12. A method for manufacturing pellets of hot-melt ink comprising the steps of:
    pouring molten ink from a plurality of nozzles, through a plurality of corresponding filling holes formed in a first die of a mold and into associated mold cavities defined by at least a second die and a third die of the mold, wherein the filling holes in the first die are configured to have their smallest diameters at the interfaces between the first and second dies, and said first, second and third dies being detachably attached to each other,
    overfilling the mold cavities with the molten ink causing excess molten ink to partially extend into the filling holes of the first die,
    allowing the ink to cool down and solidify in the mold,
    separating the first die from the second and third dies thereby removing any overfilled solidified ink and exposing filling openings of the second die, and
    separating the second die and the third die and removing the ink pellet therefrom.

13. The method of claim 12, wherein the filing holes have internal dimensions smaller than that of the mold cavities.

14. The method of claim 12, wherein the filling holes have a substantially conical shape with their smallest diameters positioned at the interface with the second die defining filling openings to the mold cavities.

* * * * *